July 14, 1925.
R. M. ALLEN ET AL
ACOUSTICAL DEVICE
Filed June 24, 1919
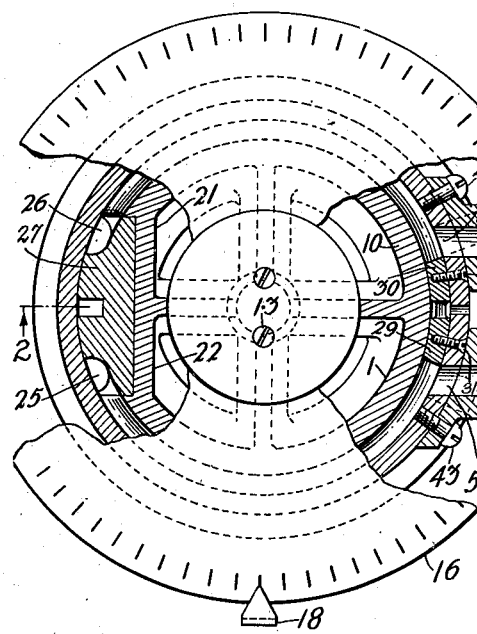
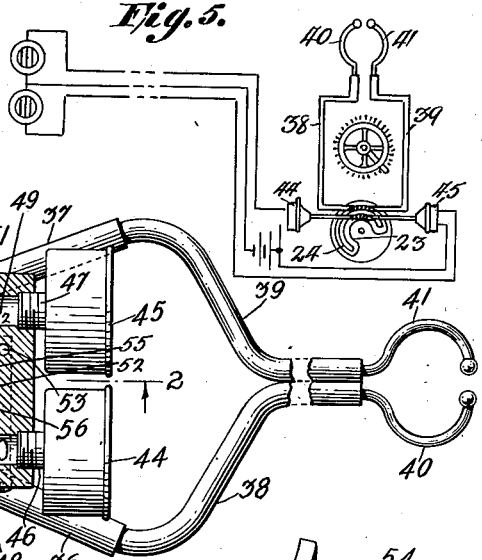
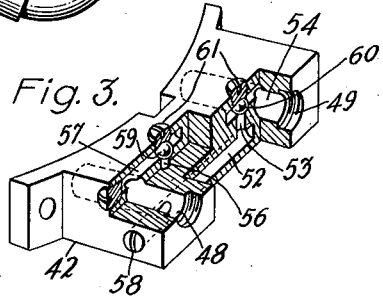
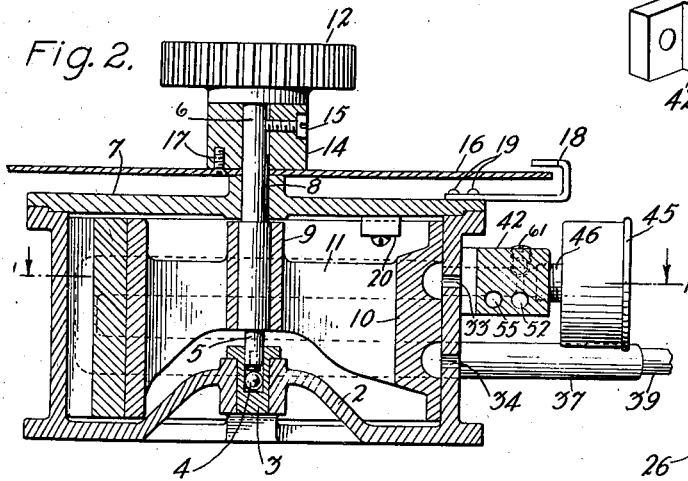
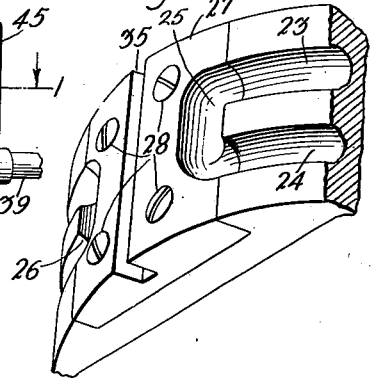
Inventors:
Roy M. Allen.
George F. Atwood.
by J. E. Roberts Att'y.

Patented July 14, 1925.

1,545,576

UNITED STATES PATENT OFFICE.

ROY M. ALLEN, OF BLOOMFIELD, AND GEORGE F. ATWOOD, OF NEWARK, NEW JERSEY, ASSIGNORS TO WESTERN ELECTRIC COMPANY INCORPORATED, OF NEW YORK, N. Y., A CORPORATION OF NEW YORK.

ACOUSTICAL DEVICE.

Application filed June 24, 1919. Serial No. 306,408.

*To all whom it may concern:*

Be it known that we, ROY M. ALLEN and GEORGE F. ATWOOD, citizens of the United States, residing at Bloomfield, in the county of Essex, State of New Jersey, and at Newark, in the county of Essex, State of New Jersey, respectively, have invented certain new and useful Improvements in Acoustical Devices, of which the following is a full, clear, concise, and exact description.

This invention relates to acoustical devices and more particularly to devices of this character employed in the binaural method of detecting and locating sources of vibration.

In such methods it is the usual practice to introduce an independent air path between each of a pair of relatively fixed devices for converting the vibrations into observable effects, and the opposite ears of an observer. By the proper relative adjustment in the lengths of the two air paths, the difference between the times of arrival of the vibrations at each of the affected devices may be compensated so that a binaural balance is obtained, or in other words, the observer receives the impression that the source is directly ahead. The angular relation of the source to a base line joining the vibration responsive portions of the converting devices then may be determined from a reading of an indicating means showing the relatively effective lengths of the adjustable air paths.

In order that accurate observation may be made with this method, it is desirable that there shall be no interference, such as is commonly called cross talk, between the observable effects contemporaneously passing over the two air paths.

In the detection and location of rapidly moving sources of vibration such as submarine or other marine vessels, it is essential that the lengths of the air paths may be quickly and readily adjustable without deleteriously affecting the observations.

In some cases it is essential that a small device of this nature provide air paths of considerable length.

It is the object of this invention to provide an acoustical compensating device in which comparatively long air paths are provided in which the observable effects are maintained free of interference and may be quickly adjusted without affecting the accuracy of the observation.

To attain this object in accordance with one feature of the invention, the sound paths are included between the periphery of a drum member and the interior enclosing surface of a casing, thus reducing the size of the completed device to a minimum, although providing a device of sufficient mass to substantially eliminate the transfer of sounds through the metal between the paths.

In accordance with another feature of the invention, cross air paths at atmospheric pressure are introduced in all acoustic paths interconnecting the adjustable length paths.

In accordance with a further feature of the invention, means is provided interconnecting the adjustable air paths in such a manner that the pressures introduced therein, due to sudden changes in their adjustment, are equalized.

These and other features, not specifically mentioned above, will clearly appear in the following specification and the annexed drawing, in which Figs. 1 and 2 respectively show a plan view partially in section and a sectional view of a device embodying the invention, while Fig. 3 illustrates in perspective, also partially in section, the equalizing mechanism, Fig. 4 shows an enlarged perspective of a portion of the device, and Fig. 5 shows diagrammatically the circuit connections used with the device. In the drawing, a cylindrical casing 1 is provided with a plurality of inwardly extending bridge members 2 at one end supporting the concentrically located bearing socket 3, containing a ball-bearing 4, upon which the pin 5 in the lower end of the rotatable shaft 6 rests. The upper end of the casing 1 is closed by a cover plate 7 in which there is formed a journal 8 for the shaft 6. A drum 10, having a hub 9 and a plurality of spokes 11 attached to the shaft in any suitable manner rotates therewith, the exterior surface of such drum being in close contact with the interior surface of the casing 1. A knob or handle 12 attached by screws 13 to a ferrule 14, secured in position on the shaft 6 by a set screw 15, is provided for rotating the drum 10. A suitably graduated scale plate 16 attached to the under side of rotatable ferrule 14 by a screw 17 cooperates with the fixedly positioned index pointer 18, attached to the cover plate 7 by means of screws 19, to indicate the angular position of the drum 10 within the casing 1. A lug 20, attached to the under side of the cover plate 7, cooperates with the plane surfaces 21 and 22 on the interior of the drum to limit the amount of rotation of the drum in either direction.

Two horizontal grooves 23 and 24, preferably semi-circular in cross-section, cut or otherwise formed in the peripheral surface of the drum are interconnected by U-shaped channels 25 and 26 in either side of the member 27 secured to the drum by screws 28, to form a single closed loop. Slightly separated stops 29 and 30 mounted on the inside of the casing 1 and secured thereto by screws 31 and 32 slidably engage the groove 23, while similar stops in vertical alignment therewith similarly engage groove 24. Apertures 33 and 34 in the casing wall insure that the body of air included in the spaces between the respective pairs of stops shall be under atmospheric pressure. The aligned lugs serve to divide the single looped groove into two substantially U-shaped portions, each comprising equal length portions of each groove and one of the U-shaped channels 25 and 26. The vertical channel 35 in the member 27 provides a body of air that is also maintained at atmospheric pressures due to the clearance provided between the lower end of the drum 10 and the bottom of the casing 1, and between the upper end of the drum 10 and the cover plate 7 respectively.

Adjacent respectively opposite sides of the stops engaging groove 24, bushings 36 and 37 suitably engage holes through the casing wall and are thereby acoustically connected with the groove 24. Ordinary stethoscopic tubes 38 and 39, preferably of rubber and engaging ordinary stethoscopic ear pieces 40 and 41 respectively, are connected to the bushings 36 and 37 respectively. In order that the device may be operated rapidly without experiencing difficulty due to sudden changes in pressure within the air paths, there is provided an equalizing mechanism 42 which is secured to the exterior of the casing 1 by screws 43. This mechanism supports the enclosed telephonic receivers 44 and 45 by means of rigid tubes 46 and 47 extending from the receivers and threaded into the body portion of the mechanism 42 in alignment with passage ways 48 and 49 therethrough. The receivers 44 and 45 are not shown in detail since their exact structure is not essential to a clear comprehension of the invention, any usual enclosed type of receiver being suitable for the purpose, the tubes 46 and 47 being so located in the casing as to convey the sounds produced by the receivers in response to variations in electrical characteristics of associated circuits. Apertures 50 and 51 in the casing wall adjacent relatively opposite sides of stops 29 and 30 in alignment with passage ways 48 and 49 complete the acoustic paths from the receivers to the groove 23. Thus an acoustic path is established from receiver 44, through tube 46, passage way 48, aperture 50, a portion of groove 23, U-shaped channel 25, a portion of groove 24, bushing 36, and tube 38 to ear piece 40, while a similar path is completed from receiver 45, through tube 47, passage way 49, aperture 51, a portion of groove 23, U-shaped channel 26, a portion of groove 24, bushing 37 and tube 39 to ear piece 41.

It will be evident that upon rotation of the drum 10 by means of the handle 12, one of these acoustic paths will be lengthened, while the other path will be simultaneously shortened by an equal amount.

A horizontal passage way 52 extending from one side of the mechanism 42, connects with passage way 48, then with a vertical passage way 53 leading to another horizontal passage way 54 extending to the opposite side of the mechanism leading to the upper portion of passage way 49 at an intermediate point. A similar passage way 55 extends from the other side of the mechanism, and connects with passage way 49, then with a vertical passage way 56 which also connects with a horizontal passage way 57 leading to the passage way 48. Suitable plugs 58, threaded into the body portion of the mechanism 42, serve to close the ends of the passage ways 52, 54, 55 and 57. A ball 59 resting in the upper end of vertical passage way 56 serves to normally close the opening into horizontal passage way 57, while a similar ball 60 resting in the upper end of vertical passage way 53 serves to normally close the opening into horizontal passage way 54. Adjustable plugs 61, threaded into the body portion of the mechanism 42, limit the upward movement of the balls 59 and 60. Thus, normally the passage ways 48 and 49 are not interconnected by air paths but an abnormal increase in pressure in either passage way lifts one of the ball valves from its seat and permits air to flow to the other passage way.

In operating, the sounds produced by receivers 44 and 46 are conveyed over the acoustic paths previously traced therefrom to ear pieces 40 and 41 respectively. The handle 12 is then rotated to cause an inverse and equal variation in the lengths of the U-shaped portions of the grooves until a binaural balance is obtained, or in other words, until the observer, listening binaurally to the sounds emanating from the ear pieces, receives the impression that the source is straight ahead. The relation of the index 18 to the graduations on the scale plate 16 when such a result is obtained, indicates the relative lengths of the air paths interposed between the receivers and the respective ear pieces to compensate for the difference in the time of arrival of the vibrations at the vibration responsive portions of the converting devices associated with the operating circuits of the receivers.

It has been found in practice that there is a tendency, due to differences in pressure in adjacent sound passage ways or grooves occurring during observation, for the sound waves to escape from one groove into another. For example, in the construction illustrated, were no means present to prevent it, there would be a tendency for sound waves to travel through the air included in the necessary clearance space between the exterior surface of the drum 10 and the enclosing casing 1. This conductor gives rise to what is commonly called cross-talk between the two paths, or conduits which materially interferes with accurate observations. Experimental studies have shown that cross-paths of air at atmospheric pressure at these points effectually prevent this interchange. The channel 35 and the spaces between the lugs slidably engaging the grooves are provided for this purpose.

Material differences in the pressures existing in the two closed loop or U-shaped portions of the groove also interfere with accurate observation due to the difference in the effect upon the observer's ears, and the ball valves 59 and 60 of the equalizing mechanism 42 serve to maintain a substantially equal pressure in the two paths, since any abnormal increase in pressure in one conduit is transmitted to the other conduit. Thus it is possible with a device embodying this invention to quickly change the adjustment in the lengths of the air paths without introducing any objectionable differences in pressure between the two paths.

What is claimed is:

1. In an acoustical device having a plurality of separate air conduits, means for varying the relatively effective lengths of the conduits, and means for equalizing the pressures within the conduits.

2. An acoustical device provided with two separate air conduits, means for varying the relatively effective lengths of the conduits, and means for maintaining equal pressures within the conduits independent of the speed of variation in the lengths of the conduits.

3. An acoustical device for the binaural observation of sounds having two sound paths therein and including means for simultaneously causing the inverse and equal variation in the lengths of such paths while maintaining equal the lengths of two parallel portions of each such paths.

4. In an acoustical device, a rotatable cylinder having two parallel grooves therearound interconnected at two points in the circumference of the cylinder to form a continuous loop, a casing enclosing the cylinder and cooperating therewith to close the grooves therein, stops rigidly attached to the interior of the casing and slidably engaging the parallel grooves to divide the loop into two substantially U-shaped portions, and means for rotating the cylinder to simultaneously cause an inverse and equal variation in the total lengths of the U-shaped portions.

5. In an acoustical device, an enclosing casing having a plurality of apertures in the wall thereof, a shaft rotatably supported therein, a drum member supported by the shaft having a groove therearound in the exterior surface thereof forming a loop and having another groove in the exterior surface interposed between the adjacent ends of the loop, two pairs of spaced stops attached to the casing with the lugs of each pair on opposite sides of apertures in the casing and engaging the grooves to divide the loop into two substantially U-shaped portions, sound producing devices mounted on the exterior of the casing and acoustically connected with each U-shaped portion adjacent the stops of one pair, outlet members also acoustically connected with each U-shaped portion adjacent the stops of the other pair, and means for rotating the shaft to simultaneously vary the distances through the groove from the sound producing devices to the outlet members.

6. In an acoustical device, a rotatable drum having a horizontal groove for conveying sounds extending partially around the periphery thereof and a vertical groove located between the ends of the groove and open to atmospheric pressure, and an enclosing casing cooperating with the periphery of the drum to close the sound groove, whereby the interchange of sounds between the ends of the horizontal groove is prevented by the atmospheric pressure maintained in the vertical groove.

7. An acoustical device having a plurality of adjacent acoustic paths and provided with an auxiliary passage way open to atmospheric pressure intermediate the adjacent paths to prevent the transfer of sound waves between such paths.

8. An acoustical device comprising a casing, a drum rotatable therein provided with a channel in its cylindrical surface affording an acoustic path through the device and a stop carried by the casing and entering the channel, whereby rotation of the drum adjusts the effective length of the channel.

9. An acoustical device comprising a casing, a drum rotatable therein provided with a plurality of channels in its cylindrical surface affording a plurality of acoustic paths through the device, and a plurality of stops carried by the casing and entering the channels, whereby rotation of the drum adjusts the effective lengths of the channels.

10. A compensator having two relatively movable members cooperating to form an air passage varied in length by movement of said members, and means for relieving air pressure in said passage but preventing escape of sound waves.

In witness whereof, we hereunto subscribe our names this 18th day of June A. D., 1919.

ROY M. ALLEN.
GEORGE F. ATWOOD.